Nov. 6, 1951    A. W. LINDGREN    2,573,977
ROCK PLOW OR SCARIFIER
Filed June 19, 1947
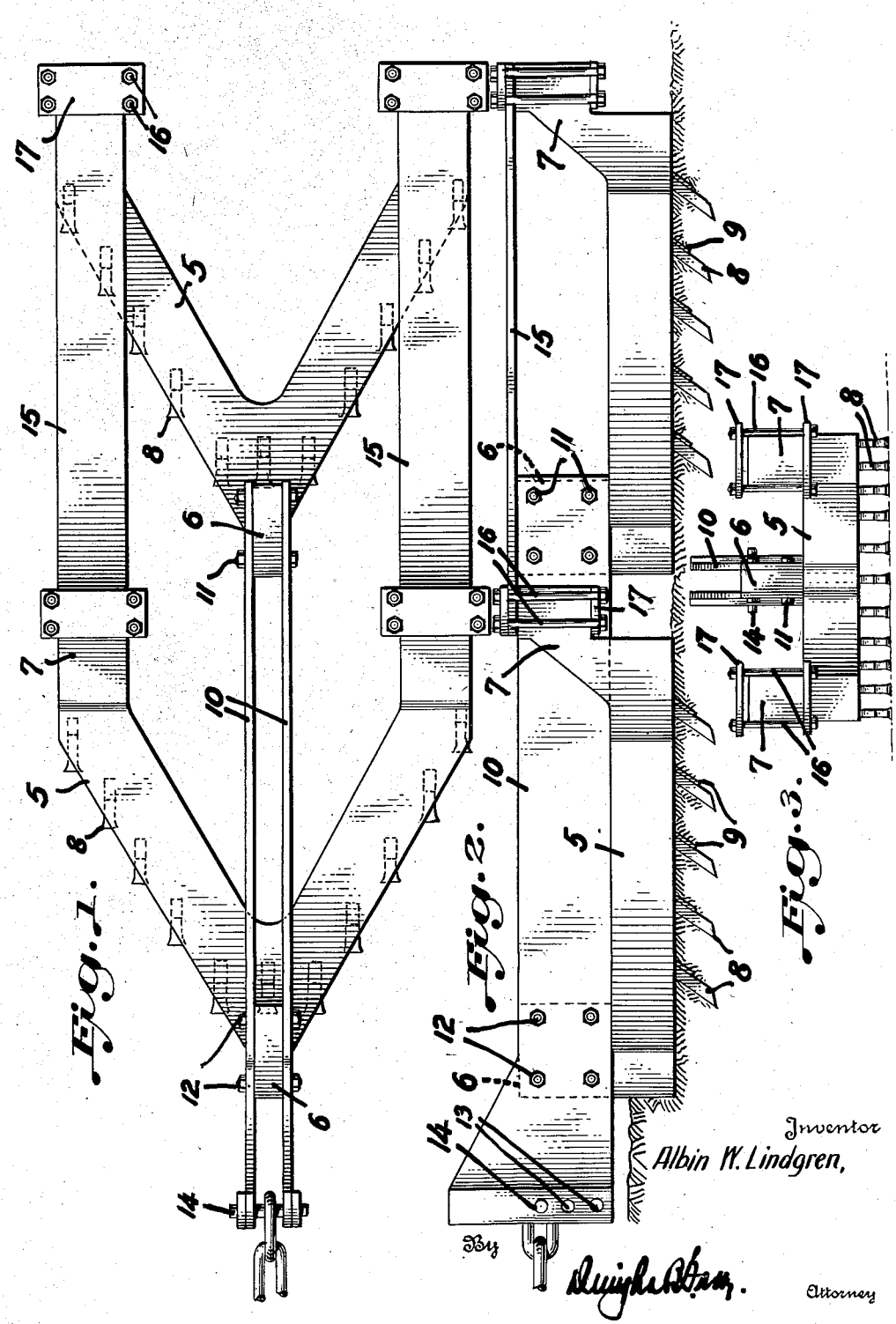
Inventor
Albin W. Lindgren,
By
Attorney

UNITED STATES PATENT OFFICE 2,573,977

ROCK PLOW OR SCARIFIER

Albin Walter Lindgren, Goulds, Fla.

Application June 19, 1947, Serial No. 755,651

2 Claims. (Cl. 262—8)

This invention is a rock plow or scarifier adapted for use in the preparation of rocky or root embedded land for agricultural or other uses.

In those localities where land is of rock, coral or slag formation, the ordinary apparatus for clearing, leveling and preparing the land for agricultural or other uses, are usually inefficient. This is due to the fact that such apparatus as has been heretofore employed is inadequate to cope with or break up the heavy solid formations, such as rock, coral and slag. The same is true where the land has tree or heavy plant roots embedded therein. It has been necessary, therefore, to resort to special apparatus for treating land in those localities where these conditions are found, this special apparatus usually including heavy machinery and apparatus capable of performing the work satisfactorily and efficiently and at the same time in an economical manner.

The present invention is a rock plow or scarifier designed particularly for use in such areas as have been referred to, and wherein the heavier materials, such as rock, shale or coral will be broken up and torn apart effectively and in such manner that subsequent treatments may render it suitable for agricultural or other purposes.

An object of the invention is to provide apparatus of the character and for the purposes stated which is of comparatively simple construction, which may be manufactured by simple processes, which involves the use of but few parts, which has its parts so constructed and assembled as to withstand the strains and stresses to which it must necessarily be subjected in use while at the same time performing its function adequately, which is capable of such adjustments as may be necessitated in the treatment of various types of land, and which will prove fully adequate in performing the functions for which it is designed.

Other objects and advantages will appear as the description proceeds, and with particular reference to the drawings, wherein:

Fig. 1 is a top plan view of a rock plow or scarifier involving the invention,

Fig. 2 is a side elevation of the plow, and

Fig. 3 is a rear elevation of the plow.

The invention involves a plow or scarifier in the form of a drag to be secured by a suitable hitch to the rear of a tractor or other propelling device capable of drawing it over or through the land to be treated. The plow may involve one, two, three or more drag elements as conditions may require, and these elements are all constructed and assembled in such manner as to effectively treat or break up the heavier formations as well as to tear apart and remove roots that may be embedded in the land.

The plow includes two or more castings all of identical shape and construction and the description of one will suffice for all. The plow includes a body 5 preferably comprising a heavy casting adapted to lie flat upon the ground and to be dragged thereover by the propelling vehicle. This casting is of V-shape as shown in Fig. 1, the apex of which includes an integral upwardly and forwardly extending head 6 at the apex thereof. The rear ends of the casting are deflected rearwardly to provide shoulder portions 7 disposed in parallelism with the central draft line of the casting, these shoulders being extended rearwardly beyond the rear extremities of the casting and having their upper surfaces forming tables in substantially the same horizontal plane as the upper surface of the head 6. It will be understood, of course, that these castings with the head and shoulders will be relatively heavy in order that they may possess sufficient strength to withstand the strains and stresses incident to their use in rocky or heavily root infested land.

The undersurface of each of the divergent legs of the V-shaped casting have depending therefrom scarifier teeth 8 which may be fitted into sockets formed in the casting and held securely therein by wedges 9 as shown. These teeth may be spaced apart such distances as may be found most desirable and may be in any number desired or required for use.

The bodies or castings are arranged preferably in pairs, one to follow another in longitudinal alignment. The head members 6 are connected by straight parallel draft bars 10 of rigid construction, the rear ends of the bars being bolted securely as at 11 to the head 6 of the follower casting while the forepart of bars are similarly bolted as at 12 to the head 6 of the lead casting. The bars 10 project forwardly from the head of the lead casting and include a series of openings 13 arranged vertically in the bars for the accommodation of a pin 14 constituting a hitch by means of which the assembled castings may be attached to a draft vehicle, not shown. It will be understood that the point of connection of the hitch with the draft bars will determine or regulate the depth to be reached by the rock plow as it is dragged over and through the land.

The assembled bodies or castings are maintained in stabilized relationship by stabilizing plates 15, one disposed at each side of the castings. These plates extend from the top surfaces of the shoulders of the lead casting to the corresponding shoulders of the follower casting, and bolts 16 extending through assembly plates 17 attach the stabilizing plates securely to their respective shoulders 7. These bolts are arranged in pairs upon each side of the shoulders and flush against the same in order to obviate the possibility of side sway of one casting with respect to the other.

In operation, the bodies or castings will be employed in such numbers as may be found necessary in treatment of the land, and the hitch or draft apparatus will be connected to the forward end of the draft bars so as to determine the depth the plow is to assume in its operation. When power is applied to the hitch, the draft line is through the longitudinal centers of the castings, and the pull is delivered directly to the heads 6 of each casting. The stabilizing plates 15 bear no part of this pull, but maintain the rear ends of the castings in proper alignment and against any tendency to sway with respect to one another. The teeth 8 will penetrate the ground and will dig into such rock, shale or coral as may be encountered and will also tear apart roots or other obstacles encountered as the plow advances. Such obstacles or solid materials as may lie close to the surface of the land will be broken and torn apart by the advancing V-shaped casting body, as in practice the casting will lie well below the surface of the land being treated.

As has been before stated, the nature of the land to be acted upon will largely determine the number of castings to be employed, and while but two are shown in coupled relationship in this disclosure, it will be understood that three or more may be similarly connected where required.

Having thus described my invention, I claim:

1. In a rock plow, a pair of castings of substantially V-shape adapted to lie flat upon the ground one behind the other, a head projecting upwardly and forwardly from the apex of each casting, draw bars secured one on each side of and connecting the heads of each casting, a shoulder rising from each side of each casting at the rear thereof and having their upper ends disposed in the same horizontal plane with the upper ends of said heads, a tie plate at each side of said castings, said plates disposed longitudinally of said castings and resting at their ends upon the shoulders thereof, and bolts securing the ends of said plates to their respective shoulders.

2. In a rock plow, a pair of identical castings of V-shape adapted to lie flat upon the ground one behind another and in true longitudinal alignment, a head projecting upwardly from the apex of each casting, draw bars disposed one on each side of said heads extending from one to the other and bolted thereto to rigidly hold said castings together, a shoulder rising from each side of each casting at the rear end thereof, said shoulders of said castings disposed in longitudinal alignment with one another and spaced equidistant from the longitudinal center of said castings, and tie plates disposed longitudinally of said castings and secured at their ends to said shoulders.

ALBIN WALTER LINDGREN.

REFERENCES CITED

The following references are of record in the file of this patent:

UNITED STATES PATENTS

| Number | Name | Date |
|---|---|---|
| 1,033,574 | Freeman | July 23, 1912 |
| 1,115,900 | Cook | Nov. 3, 1914 |
| 1,507,833 | Jarmin | Sept. 9, 1924 |
| 2,302,899 | Troup | Nov. 24, 1942 |
| 2,354,560 | Troup | July 25, 1944 |